United States Patent
Ye

(10) Patent No.: US 12,324,716 B2
(45) Date of Patent: Jun. 10, 2025

(54) ELECTRIC TOOTHBRUSH, AND MOTOR CONTROL METHOD, DEVICE, SYSTEM, CONTROL BOARD, AND MEDIUM FOR THE SAME

(71) Applicant: Shenzhen Shuye Technology Co., Ltd., Guangdong (CN)

(72) Inventor: Hongxin Ye, Zhejiang Province (CN)

(73) Assignee: Shenzhen Shuye Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/747,942

(22) Filed: Jun. 19, 2024

(65) Prior Publication Data

US 2025/0120799 A1    Apr. 17, 2025

(30) Foreign Application Priority Data

Oct. 12, 2023  (CN) .......................... 202311324493.X

(51) Int. Cl.
*H02P 1/00*      (2006.01)
*A61C 17/22*    (2006.01)
*A61C 17/34*    (2006.01)

(52) U.S. Cl.
CPC ........ *A61C 17/221* (2013.01); *A61C 17/3418* (2013.01)

(58) Field of Classification Search
CPC . A61C 17/221; A61C 17/3418; H02P 25/032; H02P 29/50
See application file for complete search history.

(56) References Cited

FOREIGN PATENT DOCUMENTS

CN          111643207 A   *   9/2020   ............. A61C 17/26

\* cited by examiner

*Primary Examiner* — Karen Masih

(57) ABSTRACT

An electric toothbrush, and a motor control method, a device, a system, a control board, and a storage medium for the same. The motor control method for an electric toothbrush includes: obtaining a start or regulation signal; controlling a motor shaft of the electric toothbrush to vibrate at a preset frequency relative to a preset oscillation centerline according to the start or regulation signal; obtaining a position parameter of the preset oscillation centerline of the motor shaft of the electric toothbrush; and controlling the preset oscillation centerline of the motor shaft of the electric toothbrush to move around an axis of the motor shaft along a preset trajectory.

26 Claims, 10 Drawing Sheets

ELECTRIC TOOTHBRUSH, AND MOTOR CONTROL METHOD, DEVICE, SYSTEM, CONTROL BOARD, AND MEDIUM FOR THE SAME

CROSS REFERENCE

The present disclosure claims priority of Chinese Patent Application No. 202311324493.X, filed on Oct. 12, 2023, the entire contents of which are hereby incorporated by reference in their entirety.

TECHNICAL FIELD

The present disclosure relates to the technical field of electric toothbrushes, and more specifically to a motor control method for an electric toothbrush.

BACKGROUND

Vibrating electric toothbrushes are widely recognized and loved by the market because they have the advantages of less wear and tear on teeth and less likely to damage gums. The vibrating electric toothbrush is adopted with a vibrating motor to produce high-frequency vibration of the brush head perpendicular to the length of the brush handle, in order to efficiently scrub teeth.

The current vibrating electric toothbrush can only realize high-frequency reciprocating vibration, and cannot simulate a large reciprocating oscillation of the human hand around an axis direction of the motor shaft. Therefore, it cannot efficiently and comprehensively clean the oral cavity when not used correctly. In addition, due to different users or different scrubbed parts of the mouth, the brush head oscillates differently around the axis direction of the motor shaft. That is, the current vibrating electric toothbrush cannot meet the scrubbing needs of different users and for cleaning different parts, and thus the product experience is poor.

The foregoing is only intended to assist in understanding the technical solution of the present disclosure, and does not mean that the foregoing is recognized as prior art.

SUMMARY OF THE DISCLOSURE

In view of the above problems, the present disclosure proposes a motor control method for an electric toothbrush, aiming to solve the technical problem that the electric toothbrush is unable to efficiently and comprehensively clean the oral cavity, as well as not being able to satisfy the scrubbing needs of different users and for cleaning of different parts of the oral cavity.

In order to realize the above purpose, the proposed motor control method includes: obtaining a start or regulation signal; controlling a motor shaft of the electric toothbrush to vibrate at a preset frequency relative to a preset oscillation centerline according to the start or regulation signal; obtaining a position parameter of the preset oscillation centerline of the motor shaft of the electric toothbrush; and controlling the preset oscillation centerline of the motor shaft of the electric toothbrush to move around an axis of the motor shaft along a preset trajectory.

In some embodiments, the obtaining a position parameter of the preset oscillation centerline of the motor shaft of the electric toothbrush includes: obtaining a forward maximum vibration position parameter and a reverse maximum vibration position parameter of the motor shaft of the electric toothbrush around the axis through a Hall sensor according to the start or regulation signal, and determining the position parameter of the preset oscillation centerline of the electric toothbrush according to the forward maximum vibration position parameter and the reverse maximum vibration position parameter.

In some embodiments, the controlling the preset oscillation centerline of the motor shaft of the electric toothbrush to move around an axis of the motor shaft along a preset trajectory includes: in an oscillation mode, controlling the preset oscillation centerline of the electric toothbrush to oscillate a preset angle around the axis of the motor shaft in a forward and reverse reciprocation; wherein the preset angle is greater than or equal to 10 degrees and less than or equal to 60 degrees; and/or in a rotation mode, controlling the preset oscillation centerline of the electric toothbrush to rotate 360 degrees around the axis of the motor shaft.

In some embodiments, the controlling the preset oscillation centerline of the motor shaft of the electric toothbrush to move around an axis of the motor shaft along a preset trajectory includes: controlling the preset oscillation centerline of the motor shaft of the electric toothbrush to oscillate about the axis of the motor shaft in a forward and reverse reciprocation at a preset frequency; wherein a ratio of the preset frequency of the motor shaft vibrating to the preset frequency of the preset oscillation centerline of the motor shaft oscillating in the forward and reverse reciprocation about the axis of the motor shaft is greater than or equal to 60.

In some embodiments, the controlling a motor shaft of the electric toothbrush to vibrate at a preset frequency relative to a preset oscillation centerline according to the start or regulation signal includes: controlling the motor shaft of the electric toothbrush to vibrate at a preset vibration frequency and a preset vibration angle relative to the preset oscillation centerline through Field Oriented Control (FOC); wherein the controlling the preset oscillation centerline of the motor shaft of the electric toothbrush to move around an axis of the motor shaft along a preset trajectory includes: controlling the preset oscillation centerline of the motor shaft of the electric toothbrush to rotate around the axis of the motor shaft at a preset oscillation angle and a preset oscillation speed through the FOC.

In some embodiments, before the obtaining a start or regulation signal, the method further includes: receiving a motor calibration preparation signal, controlling the motor shaft to stop vibrating, and releasing a control on a motor by a key, such that the motor shaft is enabled to rotate around the axis under an action of an external force; sending a motor start calibration signal in response to the motor shaft being rotated until the preset oscillation centerline is aligned with a vertical centerline of the key of the electric toothbrush in a radial direction of the motor shaft; receiving the motor start calibration signal; obtaining a current position of the preset oscillation centerline of the motor shaft of the electric toothbrush according to the motor start calibration signal, and defining the current position of the preset oscillation centerline of the motor shaft as a preset initial position; and receiving a brush head calibration signal; and controlling the preset oscillation centerline of the motor shaft of the electric toothbrush to rotate to the preset initial position according to the brush head calibration signal.

In some embodiments, the controlling the preset oscillation centerline of the motor shaft of the electric toothbrush to move around an axis of the motor shaft along a preset trajectory includes: receiving a front-tooth cleaning signal or a back-tooth cleaning signal; and controlling the preset oscillation centerline of the electric toothbrush to oscillate around the axis of the motor shaft in a forward and reverse reciprocation at an oscillation frequency corresponding to the front-tooth cleaning signal or the back-tooth cleaning signal.

In some embodiments, after the obtaining a position parameter of the preset oscillation centerline of the motor shaft of the electric toothbrush, and before the receiving a front-tooth cleaning signal or a back-tooth cleaning signal; and controlling the preset oscillation centerline of the electric toothbrush to oscillate around the axis of the motor shaft in a forward and reverse reciprocation at an oscillation frequency corresponding to the front-tooth cleaning signal or the back-tooth cleaning signal, the motor control method further includes: detecting a current tooth width parameter corresponding to the brush head of the electric toothbrush, recognizing a tooth type based on the current tooth width parameter, and sending the front-tooth cleaning signal or the back-tooth cleaning signal according to the tooth type.

The present disclosure further provides a motor control device for an electric toothbrush, including: a first obtaining module, configured to obtain a start or regulation signal; a first control module, configured to control a motor shaft of the electric toothbrush to vibrate at a preset frequency relative to a preset oscillation centerline according to the start or regulation signal; a second obtaining module, configured to obtain a position parameter of the preset oscillation centerline of the motor shaft of the electric toothbrush; and a second control module, configured to control the preset oscillation centerline of the motor shaft of the electric toothbrush to move around an axis of the motor shaft along a preset trajectory.

In some embodiments, the motor control device further includes: a Hall sensor, configured to obtain a forward maximum vibration position parameter and a reverse maximum vibration position parameter of the motor shaft of the electric toothbrush around the axis according to the start or regulation signal, and determine the position parameter of the preset oscillation centerline of the electric toothbrush according to the forward maximum vibration position parameter and the reverse maximum vibration position parameter.

In some embodiments, the second control module is configured to, in an oscillation mode, control the preset oscillation centerline of the electric toothbrush to oscillate a preset angle around the axis of the motor shaft in a forward and reverse reciprocation, the preset angle being greater than or equal to 10 degrees and less than or equal to 60 degrees; and/or the second control module is configured to, in a rotation mode, control the preset oscillation centerline of the electric toothbrush to rotate 360 degrees around the axis of the motor shaft.

In some embodiments, the second control module is configured to control the preset oscillation centerline of the motor shaft of the electric toothbrush to oscillate about the axis of the motor shaft in a forward and reverse reciprocation at a preset frequency; a ratio of the preset frequency of the motor shaft vibrating to the preset frequency of the preset oscillation centerline of the motor shaft oscillating in the forward and reverse reciprocation about the axis of the motor shaft is greater than or equal to 60.

In some embodiments, the first control module is configured to control the motor shaft of the electric toothbrush to vibrate at a preset vibration frequency and a preset vibration angle relative to the preset oscillation centerline through Field Oriented Control (FOC); the second control module is configured to control the preset oscillation centerline of the motor shaft of the electric toothbrush to rotate around the axis of the motor shaft at a preset oscillation angle and a preset oscillation speed through the FOC.

In some embodiments, the motor control device further includes: a third obtaining module, configured to receive a motor calibration preparation signal; a third control module, configured to control the motor shaft to stop vibrating, and release a control on a motor by a key, such that the motor shaft is enabled to rotate around the axis under an action of an external force; and send a motor start calibration signal in response to the motor shaft being rotated until the preset oscillation centerline is aligned with a vertical centerline of the key of the electric toothbrush in a radial direction of the motor shaft; a fourth obtaining module, configured to receive the motor start calibration signal; a fourth control module, configured to obtain a current position of the preset oscillation centerline of the motor shaft of the electric toothbrush according to the motor start calibration signal, and define the current position of the preset oscillation centerline of the motor shaft as a preset initial position; a fifth obtaining module, configured to receive a brush head calibration signal; and a fifth control module, configured to control the preset oscillation centerline of the motor shaft of the electric toothbrush to rotate to the preset initial position according to the brush head calibration signal.

In some embodiments, the motor control device further includes: a sixth obtaining module, configured to receive a front-tooth cleaning signal or a back-tooth cleaning signal; and a sixth control module, configured to control the preset oscillation centerline of the electric toothbrush to oscillate around the axis of the motor shaft in a forward and reverse reciprocation at an oscillation frequency corresponding to the front-tooth cleaning signal or the back-tooth cleaning signal.

In some embodiments, the motor control device further includes: an obtaining module, configured to detect a current tooth width parameter corresponding to the brush head of the electric toothbrush; and a recognition module, configured to recognize a tooth type based on the current tooth width parameter, and send the front-tooth cleaning signal or the back-tooth cleaning signal according to the tooth type.

The present disclosure further provides an electric toothbrush, including: a motor, a memory, a processor, and a program stored in the memory; wherein the processor is configured to execute the program to perform the motor control method as any of the above.

The present disclosure further provides a control system, including the electric toothbrush as above and a mobile management module wirelessly communicatively connected to the electric toothbrush; wherein the mobile management module includes an application for interacting with the electric toothbrush and a mobile terminal for supporting an operation of the application; the application provides an operation interface for obtaining an external operation, and the application is configured to generate a motor control command based on an external operation and send the motor control command to the electric toothbrush; the electric toothbrush is configured to obtain the motor control command and control the motor to run.

In some embodiments, the electric toothbrush is connected to the mobile management module via a wireless communication module for outputting a motor operation parameter; the application is configured to output the motor control command based on the external operation to change the motor operation parameter, and the electric toothbrush is configured to obtain the motor control command and operate according to the changed motor operation parameter.

In some embodiments, the motor operation parameter includes: a vibration frequency at which the motor shaft of the electric toothbrush vibrates around the axis relative to the preset oscillation centerline, an oscillation speed at which the preset oscillation centerline of the motor shaft of the electric toothbrush moves around the axis of the motor shaft along the preset trajectory, and an angle at which the preset oscillation center of the electric toothbrush rotates around the axis of the motor shaft.

The present disclosure further provides a control board for an electric toothbrush, including: a switch module, configured to output a switching signal; a regulation module, configured to output a motor parameter regulation signal; a Hall sensor, configured to detect a position parameter of a preset oscillation centerline of a motor shaft of the electric toothbrush; and a controller; wherein an input end of the controller is electrically connected to the switch module and the regulation module, and an output end of the controller is electrically connected to a motor of the electric toothbrush; wherein the controller is configured to obtain a start or regulation signal and control the motor shaft of the electric toothbrush to vibrate at a preset frequency relative to the preset oscillation centerline according to the start or regulation signal; the controller is further configured to control the preset oscillation centerline of the motor shaft of the electric toothbrush to move around an axis of the motor shaft along a preset trajectory.

The present disclosure further provides a non-transitory computer-readable storage medium, configured to store a motor control program for an electric toothbrush; wherein the motor control program is executable by a processor to perform the motor control method as any of the above.

The present disclosure provides a motor control method for an electric toothbrush, a device, an electric toothbrush, an electric toothbrush control system, a control board for an electric toothbrush, and a readable storage medium. In the motor control method, the motor shaft of the electric toothbrush is controlled to vibrate at a preset frequency relative to the preset oscillation centerline; and after obtaining a position parameter of the preset oscillation centerline of the motor shaft of the electric toothbrush, the motor of the electric toothbrush is controlled to move along a preset trajectory around the axis of the motor shaft. The user can set the motion trajectory of the preset oscillation centerline of the electric toothbrush according to different parts of the mouth desired to be cleaned and different needs, to realize different oscillation angles and oscillation modes of the motor shaft of the electric toothbrush around its axis, so as to better simulate manual brushing. Together with the high-frequency vibration of the brush head, efficient and comprehensive cleaning of the oral cavity may be realized, while satisfying the scrubbing needs of different users and for cleaning different parts of the oral cavity.

BRIEF DESCRIPTION OF THE DRAWINGS

To more clearly illustrate the technical solutions of the embodiments of the present disclosure, the accompanying drawings of the embodiments will be briefly described below, and it will be apparent that the accompanying drawings in the following description relate only to some embodiments of the present disclosure and other drawings may be obtained from these drawings by those skilled in the art without creative labor.

Figure 1:
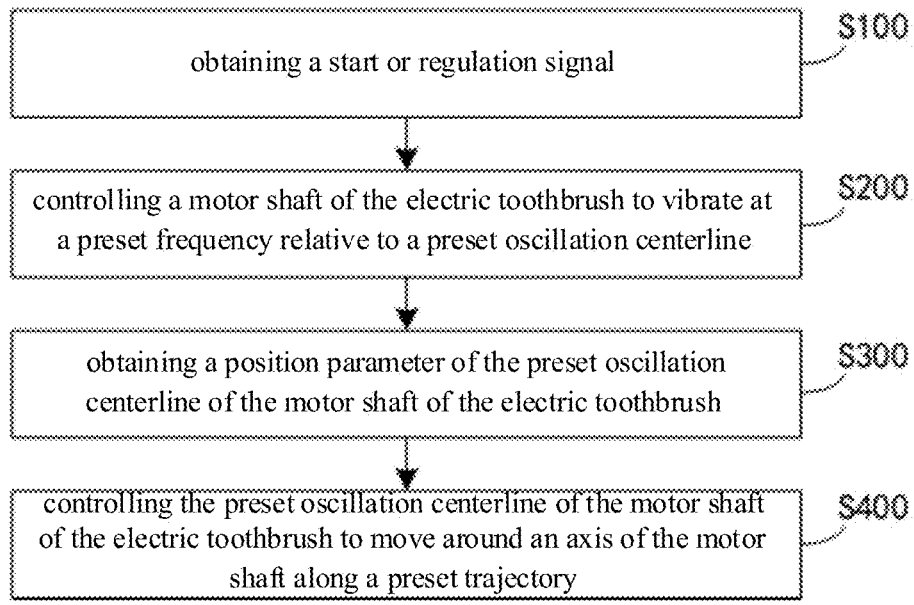
FIG. 1 is a flowchart of a motor control method for an electric toothbrush according to a first embodiment of the present disclosure.

The realization of the purpose, functional features, and advantages of the present disclosure will be further described in conjunction with the embodiments and with reference to the accompanying drawings.

DETAILED DESCRIPTION

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments in the present disclosure, all other embodiments obtained by those skilled in the art without creative labor fall within the scope of the present disclosure. In addition, the technical solutions between various embodiments can be combined with each other, but it must be based on the fact that those skilled in the art is able to realize it. When the combination of the technical solutions appears to be contradictory or unattainable, it should be considered that the combination of such technical solutions does not exist, and is not included in the scope claimed by the present disclosure.

It should be noted that when the embodiments of the present disclosure involve directional indications (such as up, down, left, right, forward, back . . . ), the directional indications are only intended to explain a relative positional relationship, a movement, etc. between the various components in a particular attitude. When the particular attitude changes, the directional indications are also changed accordingly.

In addition, when the embodiments of the present disclosure contain descriptions involving "first", "second", etc., the descriptions of "first", "second", etc. are intended only for descriptive purposes, and are not to be construed as indicating or implying their relative importance or implicitly specifying the number of the indicated technical features. That is, a feature defined as "first" or "second" may include at least one such feature either explicitly or implicitly. In addition, the meaning of "and/or" in the whole text is to include three concurrent solutions. For example, "A and/or B" includes an A solution, a B solution, and a solution in which A and B are satisfied at the same time.

References to "an embodiment" or "some embodiments" etc. described in this specification imply that one or more embodiments of the present disclosure include a particular feature, structure, or characteristic described in connection with that embodiment. As a result, the phrases "in one embodiment," "in some embodiments," "in some other embodiments," and "in several embodiments", etc. appearing in various places in this specification do not necessarily all refer to the same embodiment, but rather mean "one or more but not all embodiments" unless otherwise specifically emphasized. The terms "including," "comprising," "having" and variations thereof mean "including but not limited to," unless otherwise specifically emphasized.

In addition, the technical solutions between various embodiments may be combined with each other, but it must be based on the ability of those skilled in the art to realize them. When the combination of the technical solutions is contradictory or unattainable, it should be considered that the combination of such technical solutions does not exist, and is not included in the scope of the present disclosure.

The flowcharts shown in the accompanying drawings are only illustrative, and it is not necessary to include all the contents and operations/steps, nor is it necessary to perform them in the order depicted. For example, there are operations/steps that may be decomposed, combined, or partially merged, and thus the actual order of execution may change depending on actual situations.

Currently, a conventional electric toothbrush is only able to clean the teeth through a single mode of high-frequency vibration, which cannot simulate a large reciprocating oscillation of the human hand around an axis direction of the motor shaft and therefore cannot efficiently and comprehensively clean the oral cavity when not used correctly. In addition, the conventional electric toothbrush is unable to provide specific cleaning modes for different parts of the oral cavity, such as the tongue, teeth, and other parts of the mouth, which results in a poor overall experience when using the product.

In order to solve the above problems, the embodiments of the present disclosure provide a motor control method, a device, a system, a control board for an electric toothbrush, and a readable storage medium, so as to realize efficient and comprehensive cleaning of an electric toothbrush for the oral cavity, thereby satisfying the scrubbing needs of different users and for cleaning different parts of the oral cavity.

Referring to FIG. 1, FIG. 1 is a flowchart of a motor control method for an electric toothbrush according to a first embodiment of the present disclosure. The motor control method is applied to a motor of an electric toothbrush.

The present disclosure proposes a motor control method for an electric toothbrush.

As shown in FIG. 1, the motor control method provided by the embodiments of the present disclosure includes operations at block illustrated herein.

At block S100: obtaining a start or regulation signal.

The start or regulation signal may be a command sent from an external terminal, such as a mobile terminal (e.g., mobile phone, remote control, tablet PC), a fixed terminal (e.g., server, cloud), a key operation or a command input by a user to the electric toothbrush, etc. The obtaining the start or regulation signal may be specifically that: the electric toothbrush passively receives the start or regulation command, or the electric toothbrush obtains a result by detecting and determining according to a current situation, for example, the electric toothbrush automatically turns on after sensing a hand-held pressure and temperature of the user. The start or regulation signal may be a command to start the electric toothbrush or a command to adjust the electric toothbrush, such as adjusting a cleaning mode, a brushing duration, a vibration frequency, an oscillation amplitude, an oscillation speed, etc. of the electric toothbrush.

At block S200: controlling a motor shaft 104 of the electric toothbrush to vibrate at a preset frequency relative to a preset oscillation centerline.

The preset frequency may be an initial vibration frequency set at the factory, a vibration frequency set at the time of power-on, a vibration frequency when the user used the electric toothbrush on a previous occasion, or a vibration frequency to be set carried by an adjustment command. In other words, the vibration frequency of the motor shaft 104 of the electric toothbrush may be adjusted according to requirements. In some embodiments, the vibration frequency of the motor shaft 104 of the electric toothbrush may be adjusted and set between 26,000 times/minute to 70,000 times/minute.

It can be understood that the bristles of the electric toothbrush, when vibrating, will have a vibration along the length direction of the bristles and a tiny oscillating vibration in a direction perpendicular to the length direction of the bristles and the length direction of the brush stem. Therefore, the motor shaft 104 of the electric toothbrush actually has a slight reciprocating oscillation around the axis of the motor shaft 104 relative to the axis. The preset oscillation centerline is an oscillation centerline of the vibration of the motor shaft 104. The extension direction of the preset oscillation centerline coincides with the extension direction of the axis of the motor shaft 104 of the electric toothbrush. In actual use, the preset oscillation centerline is a vertical extension line passing through any point of a peripheral wall of the motor shaft. The preset oscillation centerline is parallel to the axis of the motor shaft 104, and a line connecting the preset oscillation centerline and the axis of the motor shaft 104 is consistent with a radial direction of the motor shaft 104. In order to facilitate assembly, generally, an end of the motor shaft 104 has a vertical cut surface, and when the end of the motor shaft is inserted into the interior of the brush head, the orientation of the vertical cut surface is consistent with the orientation of the bristles of the brush head, both of which are arranged facing the user squarely. That is, the preset oscillation centerline may actually be a vertical centerline of the vertical cut surface of the motor shaft.

At block S300: obtaining a position parameter of the preset oscillation centerline of the motor shaft 104 of the electric toothbrush.

There may be many ways to obtain the position parameter of the preset oscillation centerline of the motor shaft 104 of the electric toothbrush, such as obtaining a maximum vibration deflection position of the motor shaft 104 of the electric toothbrush in both the left and right directions when it is vibrating, and then calculating a center position of the two by means of a formula to obtain the position of the preset oscillation centerline. Of course, a miniature sensor may be arranged on the motor shaft 104 to accurately obtain the position of the preset oscillation centerline of the electric toothbrush.

At block S400: controlling the preset oscillation centerline of the motor shaft 104 of the electric toothbrush to move around an axis of the motor shaft 104 along a preset trajectory.

The motor 103 of the electric toothbrush is specifically a servo motor 103. The electric toothbrush is adopted with the servo motor 103, which operates smoothly, such that the toothbrush is capable of simultaneously realizing a high-frequency vibration and a rotation around the axis of the motor shaft 104. The preset oscillation centerline of the motor shaft 104 moves around the axis of the motor shaft 104 along the preset trajectory, and the preset trajectory can be either a forward rotation by a certain angle, a reverse rotation by a certain angle, or an alternating reciprocating rotation in forward and reverse directions, which may be selected and set according to actual needs. By controlling the preset oscillation centerline of the electric toothbrush to move around the axis of the motor shaft 104 along the preset trajectory, the user is allowed to set different preset trajectories to realize the control of the motor shaft 104 of the electric toothbrush to oscillation back and forth or rotate 360 degrees around the axis of the motor shaft 104 in a substantial manner. In this way, the user can select different oscillation angles and modes according to different parts of the oral cavity desired to be cleaned, simulating manual brushing, while superimposing high-frequency vibration of the brush head, which may realize efficient and comprehensive cleaning of the oral cavity, so as to satisfy the scrubbing needs of different users and for cleaning different parts of the oral cavity.

Figure 2:
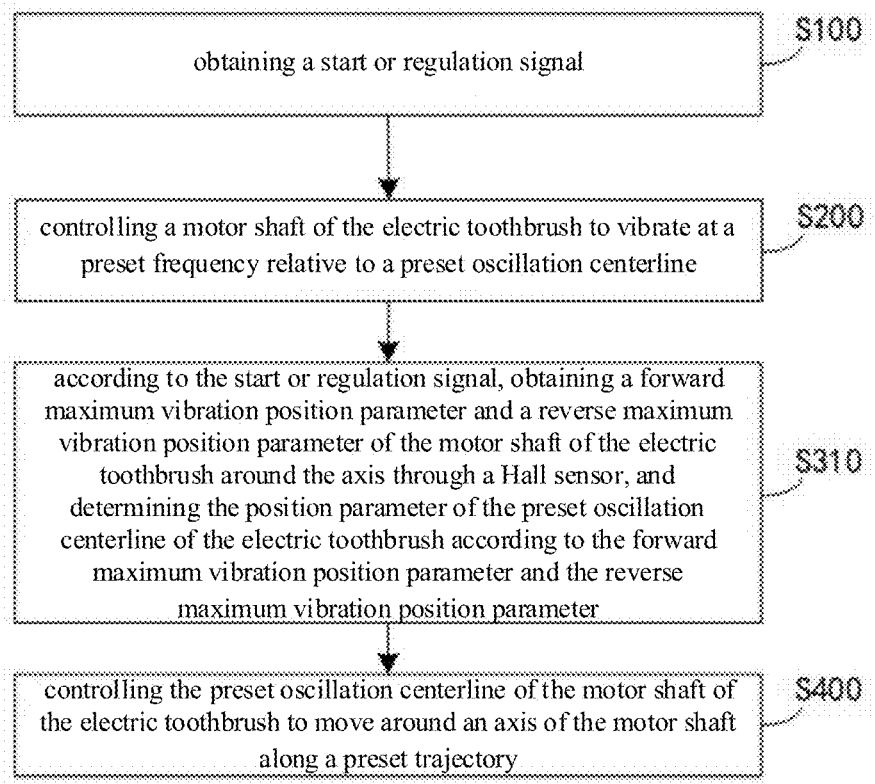
FIG. 2 is a flowchart of a motor control method for an electric toothbrush according to a second embodiment of the present disclosure.

In some embodiments, referring to FIG. 2, step S300 is specifically the following.

At block S310: according to the start or regulation signal, obtaining a forward maximum vibration position parameter and a reverse maximum vibration position parameter of the motor shaft 104 of the electric toothbrush around the axis through a Hall sensor, and determining the position parameter of the preset oscillation centerline of the electric toothbrush according to the forward maximum vibration position parameter and the reverse maximum vibration position parameter.

The electric toothbrush reciprocally vibrates around the axis of the motor shaft 104 relative to the preset oscillation centerline during actual use. It is understood that the electric toothbrush has a vibration cycle. In order to facilitate the illustration of the vibration cycle, the position of the preset oscillation centerline is defined as a zero-point a. When the electric toothbrush is vibrating, a+1° is set to 1 millisecond, and a−1° is set to 1 millisecond. That is, the movement of the electric toothbrush from the position of a−1° to the position of a+1° is a vibration cycle, and the vibration cycle is 2 milliseconds.

To accurately obtain the position of the preset oscillation centerline at a certain moment, for example, at the moment of Tn, the position of the preset oscillation centerline at the moment of Tn can be obtained by obtaining the forward maximum offset vibration position and the reverse maximum offset vibration position within a time range of Tn−1 to Tn+1, and calculating the position of the preset oscillation centerline at the moment of Tn by computer simulation or a formula. Specifically, the Hall sensor includes a circuit board and magnetic poles fixed to the motor shaft 104, the magnetic poles including a N pole and a S pole, and the N pole and S pole are arranged radially symmetrically with respect to the motor shaft 104. When the motor shaft 104 is vibrating, a receptor on the circuit board can detect the strength of the two magnetic poles, thereby obtaining a curve about the strength of the magnetic signal, and thus the position of the motor shaft 104 at each moment can be obtained through calculation. The method of determining the position parameter of the preset oscillation centerline of the electric toothbrush by the Hall sensor based on the forward maximum vibration position parameter and the reverse maximum vibration position parameter is capable of obtaining the position parameter of the preset oscillation centerline of the motor shaft 104 of the electric toothbrush at a certain moment in real time at lower cost, with less error, and with higher accuracy rate, compared to other methods.

Figure 3:
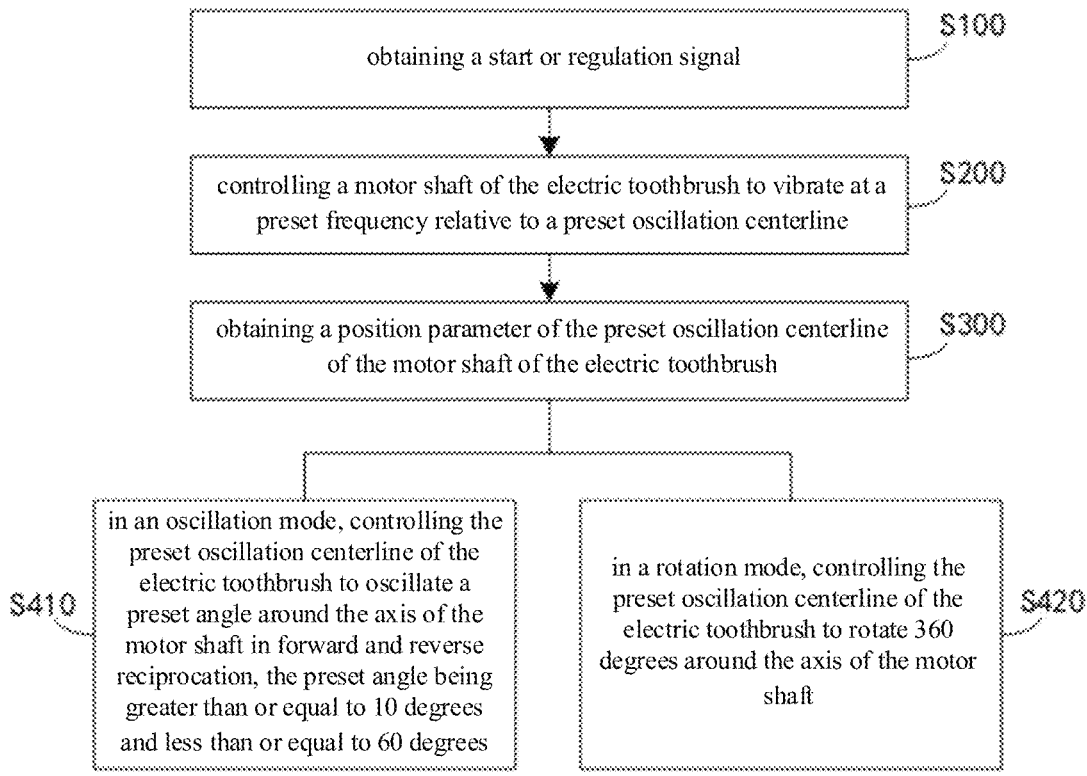
FIG. 3 is a flowchart of a motor control method for an electric toothbrush according to a third embodiment of the present disclosure.

In some embodiments, as shown in FIG. 3, step S400 is specifically the following.

At block S410: in an oscillation mode, controlling the preset oscillation centerline of the electric toothbrush to oscillate a preset angle around the axis of the motor shaft 104 in forward and reverse reciprocation, the preset angle being greater than or equal to 10 degrees and less than or equal to 60 degrees; and/or At block S420: in a rotation mode, controlling the preset oscillation centerline of the electric toothbrush to rotate 360 degrees around the axis of the motor shaft 104.

In the oscillation mode, the preset oscillation centerline of the electric toothbrush is controlled to oscillate the preset angle around the axis of the motor shaft 104 in forward and reverse reciprocation. For example, the motor shaft 104 of the electric toothbrush first oscillates a certain angle in a forward direction around the axis thereof, then oscillates another angle in a reverse direction around the axis thereof, and subsequently oscillates a certain angle in a forward direction, and so on, so as to simulate the human hand to oscillate the brush head in reciprocation to clean the teeth. The oscillation angle of the electric toothbrush may be set by the user according to the actual needs, thereby improving the versatility of the product. It is to be understood that the preset angle is an included angle between the preset oscillation centerline when the motor shaft 104 of the electric toothbrush oscillates forward to a set position and the preset oscillation centerline when the motor shaft 104 of the electric toothbrush oscillates backward to a set position. The preset angle may specifically be 10 degrees, 20 degrees, 25 degrees, 35 degrees, 40 degrees, 50 degrees, 60 degrees, etc. If the preset angle is less than 10 degrees, the oscillation of the motor shaft 104 of the electric toothbrush is small, and it cannot simulate a large oscillation of the human hand to improve the cleaning efficiency. If the preset angle is greater than 60 degrees, the oscillation amplitude of the motor shaft 104 of the electric toothbrush is too large, and the brush bristles are likely to touch the gums, which reduces the efficiency of brushing and is likely to cause bleeding of the gums. By making the preset angle greater than or equal to 10 degrees and less than or equal to 60 degrees, the oscillation angle range of the motor shaft 104 of the electric toothbrush is set reasonably, which effectively simulates the human hand to oscillate the toothbrush significantly and improve the cleaning efficiency while not damaging the gums. The preset angle of reciprocal oscillation of the preset oscillation centerline of the motor shaft 104 of the electric toothbrush may be selected and set according to actual needs, which is not specifically limited herein.

In the rotation mode, the preset oscillation centerline of the electric toothbrush is controlled to rotate 360 degrees around the axis of the motor shaft 104. The preset oscillation centerline of the electric toothbrush can be controlled to rotate in the forward direction, or the preset oscillation centerline of the electric toothbrush can be controlled to rotate in the reverse direction, where the rotation direction may be set by the factory may be set to be adjustable.

The motor shaft 104 of the electric toothbrush is arranged to have the oscillation mode and the rotation mode. In this way, in the oscillation mode, the preset oscillation centerline of the motor shaft 104 of the electric toothbrush oscillates forward and reverse reciprocally around its axis, in which case the motor shaft 104 of the electric toothbrush may be arranged with a conventional toothbrush head to drive the toothbrush head to oscillate left and right around the axis reciprocally in a substantial manner, which may simulate the human hand oscillating the brushing teeth, thereby improving the efficiency of brushing teeth and cleaning. In the rotation mode, the preset oscillation centerline of the motor shaft 104 of the electric toothbrush rotates 360 degrees around its axis, in which case the motor shaft 104 of the electric toothbrush may be arranged with a tongue brush head to drive the tongue brush head to rotate 360 degrees, such that the tongue can be subjected to 360 degrees cleaning. In this way, the user may choose to use the oscillation mode or the rotation mode according to the cleaning needs of different parts of the mouth. In other words, by using only one electric toothbrush handle compatible with different brush heads, different cleaning functions can be realized to clean different parts of the mouth, which is multi-purpose and greatly improves the convenience of the product and reduces the cost of cleaning for consumers.

The selection to enter the oscillation mode or the rotation mode may be made by a key operation or command input of the electric toothbrush from the user, or be made by a command sent from an external terminal, such as a mobile terminal (e.g., mobile phone, remote control, tablet PC), a fixed terminal (e.g., server, cloud), etc. Of course, the motor shaft 104 of the electric toothbrush may actively select to enter the oscillation mode or the rotation mode according to a result obtained by detecting and determining the current situation. For example, a magnet is arranged on the tongue brush head, no magnet is arranged on the conventional toothbrush head, and a Hall sensor is arranged on the brush handle of the electric toothbrush. When the electric toothbrush is arranged with the tongue brush head, the Hall sensor detects the tongue brush head, and then actively sends a command to the control board to control the electric toothbrush to enter the rotation mode. When the electric toothbrush is arranged with the conventional toothbrush head, the Hall sensor indicates the electric toothbrush to enter the oscillation mode.

Figure 4:
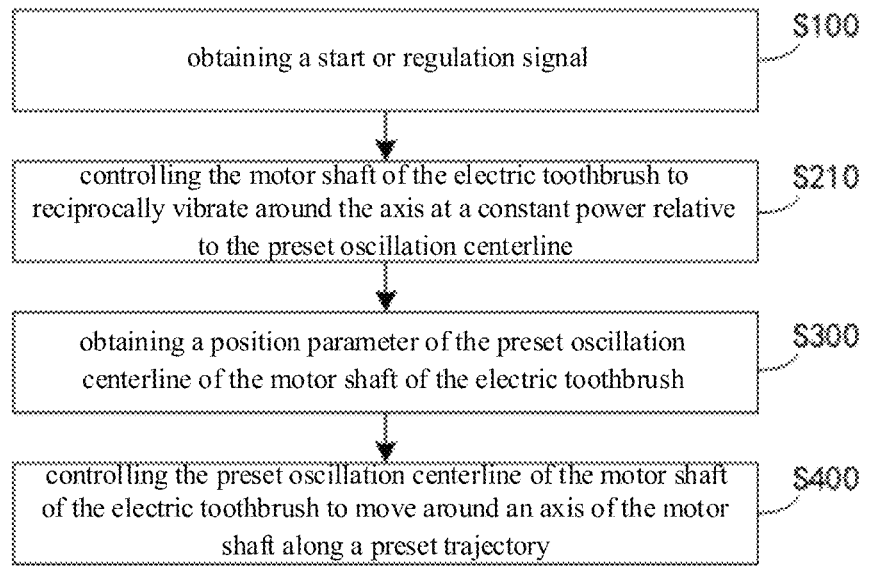
FIG. 4 is a flowchart of a motor control method for an electric toothbrush according to a fourth embodiment of the present disclosure.

In other embodiments, as shown in FIG. 4, step S200 is specifically the following.

At block S210: controlling the motor shaft 104 of the electric toothbrush to reciprocally vibrate around the axis at a constant power relative to the preset oscillation centerline.

When the brush head of the electric toothbrush contacts the teeth, there will be a reverse pressure on the brush head of the electric toothbrush. When the pressure is transmitted to the motor shaft 104 of the electric toothbrush, it will result in an uneven force output of the motor shaft 104 of the electric toothbrush to the brush head. By controlling the motor shaft 104 of the electric toothbrush to reciprocally vibrate around its axis at a constant power relative to the preset oscillation centerline, the force outputted by the motor 103 to the brush head is constant after the brush head is connected to the motor shaft 104, such that the brushing comfort and cleaning uniformity of the electric toothbrush may be improved. The specific value of the constant power of the motor shaft 104 of the electric toothbrush for reciprocating high-frequency vibration around its axis may be set according to actual needs, which is not limited herein.

In some embodiments, step S400 specifically includes:
controlling the preset oscillation centerline of the motor shaft 104 of the electric toothbrush to oscillate about the axis of the motor shaft 104 in forward and reverse reciprocation at a preset frequency; where a ratio of the preset frequency of the vibration of the motor shaft 104 to the preset frequency of the forward and reverse reciprocal oscillation of the preset oscillation centerline of the motor shaft 104 about the axis of the motor shaft 104 is greater than or equal to 60.

The preset oscillation centerline of the motor shaft 104 of the electric toothbrush oscillates about the axis of the motor shaft 104 in the forward and reverse reciprocation at the preset frequency, which can simulate the human hand reciprocatingly oscillating the brush head to clean the teeth, thereby improving the cleaning efficiency. The time required for the preset oscillation centerline of the motor shaft 104 of the electric toothbrush to move around the axis of the motor shaft 104 from a forward oscillating maximum position to a reverse oscillating maximum position in a single movement is defined as an oscillation cycle. The preset frequency of the forward and reverse reciprocal oscillation of the preset oscillation centerline of the motor shaft 104 around the axis of the motor shaft 104 is an inverse of the oscillation cycle of the electric toothbrush.

The preset vibration frequency of the motor shaft 104 is usually 26,000 times/minute to 70,000 times/minute to realize high-frequency vibration of the brush head, thereby efficiently cleaning the teeth and having a wide range of applicability to the user. By making the ratio of the preset frequency of the vibration of the motor shaft 104 to the preset frequency of the forward and reverse reciprocal oscillation of the preset oscillation centerline of the motor shaft 104 around the axis of the motor shaft 104 greater than or equal to 60, that is, the frequency of oscillation of the motor shaft 104 is much less than the frequency of vibration, the motor shaft 104 is made to oscillate at a slower frequency, thereby avoiding damage to the gums and teeth while simulating manual oscillation brushing, which improves the cleaning efficiency and comfort of use. In some embodiments, the preset frequency of the forward and reverse reciprocal oscillation of the preset oscillation centerline of the motor shaft 104 around the axis of the motor shaft 104 is substantially 100 times/minute to 400 times/minute, so as to make the frequency of the oscillation of the motor shaft 104 appropriate, which provides higher comfort to the user and avoids damage to the gums and teeth while efficiently cleaning the oral cavity.

Figure 5:
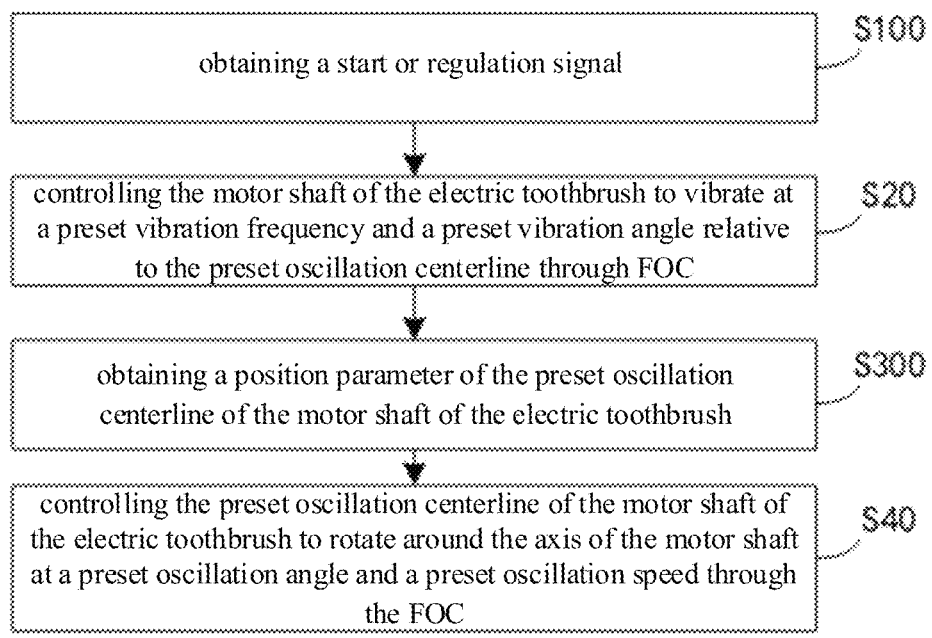
FIG. 5 is a flowchart of a motor control method for an electric toothbrush according to a fifth embodiment of the present disclosure.

In some embodiments, referring to FIG. 5, step S200 is specifically the following.

At block S20: controlling the motor shaft 104 of the electric toothbrush to vibrate at a preset vibration frequency and a preset vibration angle relative to the preset oscillation centerline through Field Oriented Control (FOC).

Step S400 is specifically the following.

At block S40: controlling the preset oscillation centerline of the motor shaft 104 of the electric toothbrush to rotate around the axis of the motor shaft 104 at a preset oscillation angle and a preset oscillation speed through the FOC.

The motor 103 of the electric toothbrush of the present disclosure may specifically be a servo motor 103. By applying the FOC on the servo motor 103, the FOC is adopted to control the vibration frequency, the vibration angle, the oscillation angle, and the oscillation speed of the motor shaft 104 in order to realize the control of the operation of the motor 103, so as to make the motion torque of the motor 103 smooth, with low noise, high efficiency, and with a high-speed dynamic response. The vibration frequency, the vibration angle, the oscillation angle, and the oscillation speed of the motor shaft 104 of the electric toothbrush may be set to be adjustable, and thus the user may select different parameters according to different requirements to enhance the versatility of the electric toothbrush.

Figure 6:
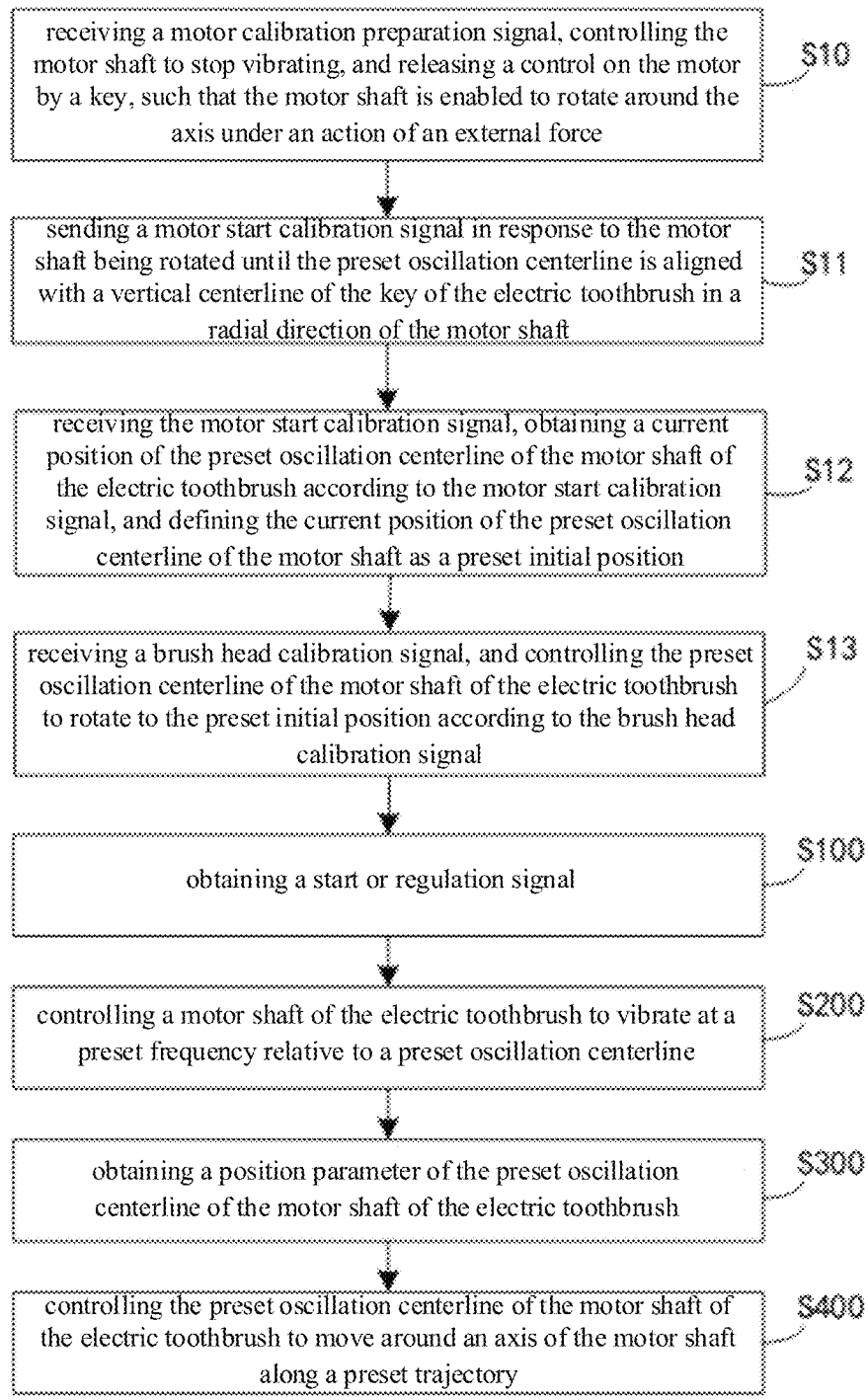
FIG. 6 is a flowchart of a motor control method for an electric toothbrush according to a sixth embodiment of the present disclosure.

In other embodiments, referring to FIG. 6, before step S100, the method further includes the following.

At block S10: receiving a motor calibration preparation signal, controlling the motor shaft 104 to stop vibrating, and releasing a control on the motor by a key, such that the motor shaft 104 is enabled to rotate around the axis under an action of an external force;

At block S11: sending a motor start calibration signal in response to the motor shaft 104 being rotated until the preset oscillation centerline is aligned with a vertical centerline of the key of the electric toothbrush in a radial direction of the motor shaft 104;

At block S12: receiving the motor start calibration signal, obtaining a current position of the preset oscillation centerline of the motor shaft 104 of the electric toothbrush according to the motor start calibration signal, and defining the current position of the preset oscillation centerline of the motor shaft 104 as a preset initial position;

At block S13: receiving a brush head calibration signal, and controlling the preset oscillation centerline of the motor shaft 104 of the electric toothbrush to rotate to the preset initial position according to the brush head calibration signal.

Since the motor shaft 104 of the electric toothbrush of the present disclosure has a mode of moving around its axis along a preset trajectory, such as reciprocal oscillation and 360-degree rotation, when the brush head is assembled to the motor shaft 104, there may be a situation in which the brush head is skewed and does not face, together with the key, the user squarely. By calibrating the motor shaft 104 before starting or adjusting specific parameters of the motor shaft 104, the position of the center point of the brush head may be calibrated to improve the accuracy of the use of the electric toothbrush.

The motor calibration preparation signal may be specifically a command sent from a charging cradle or an external terminal, such as a mobile terminal (e.g., mobile phone, remote control, tablet PC), a fixed terminal (e.g., server, cloud). The motor calibration preparation signal command may be sent via Bluetooth. When the toothbrush motor is vibrating, the motor will stop vibrating after receiving this command. At the same time, the electric toothbrush blocks the key function, in which case the user can manually rotate the motor shaft 104 to update the zero position of the motor shaft 104.

In order to facilitate assembly, generally, an end of the motor shaft 104 has a vertical cut surface, and when the end of the motor shaft 104 is inserted into the brush head, the orientation of the vertical cut surface is consistent with the orientation of the bristles of the brush head, both of which are arranged facing the user squarely. That is, the preset oscillation centerline is actually the vertical centerline of the vertical cut surface of the motor shaft 104. The user may calibrate the zero position of the motor shaft 104 through the vertical cut surface of the motor shaft 104. In actual operation, the motor shaft 104 is rotated until the vertical cut surface orients in a same direction with a plane where the key on the electric toothbrush housing is located. When the vertical centerline of the vertical cut surface of the motor shaft 104 (i.e., the preset oscillation centerline) is aligned with the vertical centerline of the plane where the motor key is located in the radial direction of the motor shaft 104, the motor shaft 104 is in the zero position. This alignment method is more convenient for the operator to operate. The motor start calibration signal may be fed back by Bluetooth, and the current position of the preset oscillation centerline of the motor shaft 104 can be defined as a preset initial position (i.e., the zero position). Subsequently, when the user is using the electric toothbrush, the user may send a brush head calibration signal to the electric toothbrush through an external terminal such as a mobile phone APP, a small program, etc., and then the toothbrush will be automatically calibrated, such that the motor shaft 104 of the electric toothbrush 104 is rotated to the zero position (the preset initial position), i.e., the orientation of the bristles of the brush head is consistent with the orientation of the key, both of which are arranged facing the user squarely In this way, the accuracy of the use of the electric toothbrush may be ensured, and it may be prevented that the brush head is deflected out of position due to long-term use.

Figure 7:
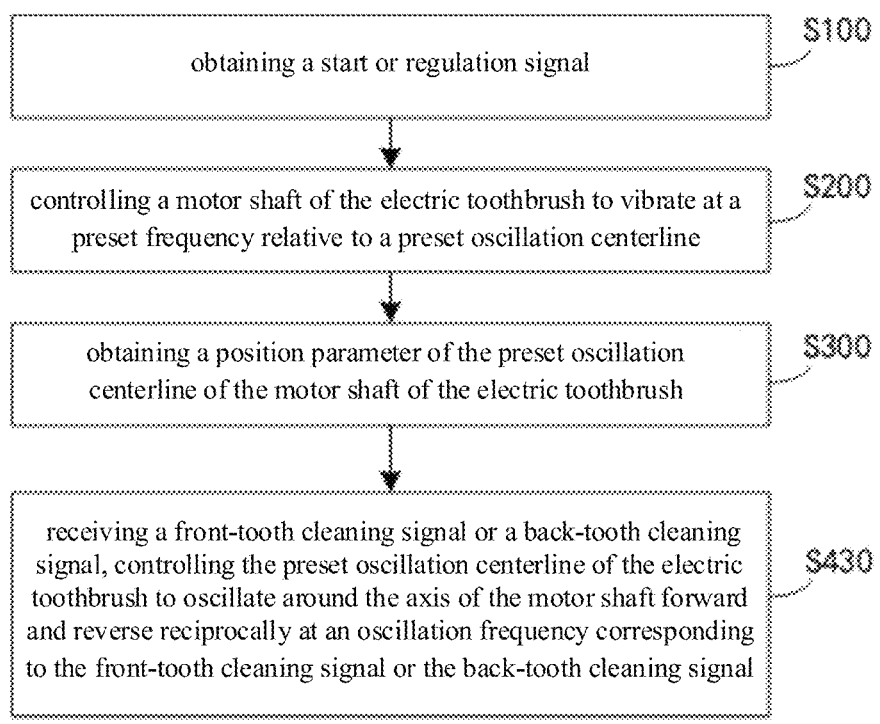
FIG. 7 is a flowchart of a motor control method for an electric toothbrush according to a seventh embodiment of the present disclosure.

In some embodiments, referring to FIG. 7, step S400 specifically includes:

At block S430: receiving a front-tooth cleaning signal or a back-tooth cleaning signal, controlling the preset oscillation centerline of the electric toothbrush to oscillate around the axis of the motor shaft 104 forward and reverse reciprocally at an oscillation frequency corresponding to the front-tooth cleaning signal or the back-tooth cleaning signal.

The time required for the preset oscillation centerline of the motor shaft 104 of the electric toothbrush to move from the forward oscillating maximum position to the reverse oscillating maximum position in a single movement around the axis of the motor shaft 104 is defined as an oscillation cycle, and thus the oscillation frequency of the preset oscillation centerline of the motor shaft 104 of the electric toothbrush to oscillate around the axis of the motor shaft 104 and the oscillation cycle are inverse to each other. Human teeth can be divided into front teeth and back teeth, and since the front teeth and the back teeth are located at different locations and with different sizes, the actual cleaning modes required for the front teeth and the back teeth are different. The oscillation frequency corresponding to the front-tooth cleaning signal and the oscillation frequency corresponding to the back-tooth cleaning signal are made different, such that different regions of the teeth can be cleaned in different modes, which may greatly improve the cleaning efficiency of the electric toothbrush for the entire oral cavity. For example, the oscillation frequency corresponding to the front-tooth cleaning signal is greater than the oscillation frequency corresponding to the back-tooth cleaning signal. The front-tooth cleaning signal or the back-tooth cleaning signal may be issued by the user via a key or an external mobile terminal, or may be issued automatically by the brush head after detection and recognition. The oscillation frequency or the oscillation cycle corresponding to the front-tooth cleaning signal and the back-tooth cleaning signal may be set and adjusted by the user, or may be adaptively adjusted by continuous learning through a neural network in an AI algorithm.

Further, the front and back teeth may be further subdivided. For example, the front teeth may be divided into mesial incisors, lateral incisors, and cuspids, and the back teeth may be divided into first molar, second molar, third molar, etc. The oscillation frequency corresponding to the front-tooth cleaning signal and the back-tooth cleaning signal may be further refined according to the different refined classifications of the front teeth and the back teeth. For example, the front-tooth cleaning signal is made to include a mesial incisor cleaning signal, a lateral incisor cleaning signal, and a cuspid cleaning signal, and the back-tooth cleaning signal is made to include a first molar cleaning signal, a second molar cleaning signal, and a third molar cleaning signal, such that the oscillation frequencies corresponding to the cleaning signals for each tooth region are different.

Figure 8:
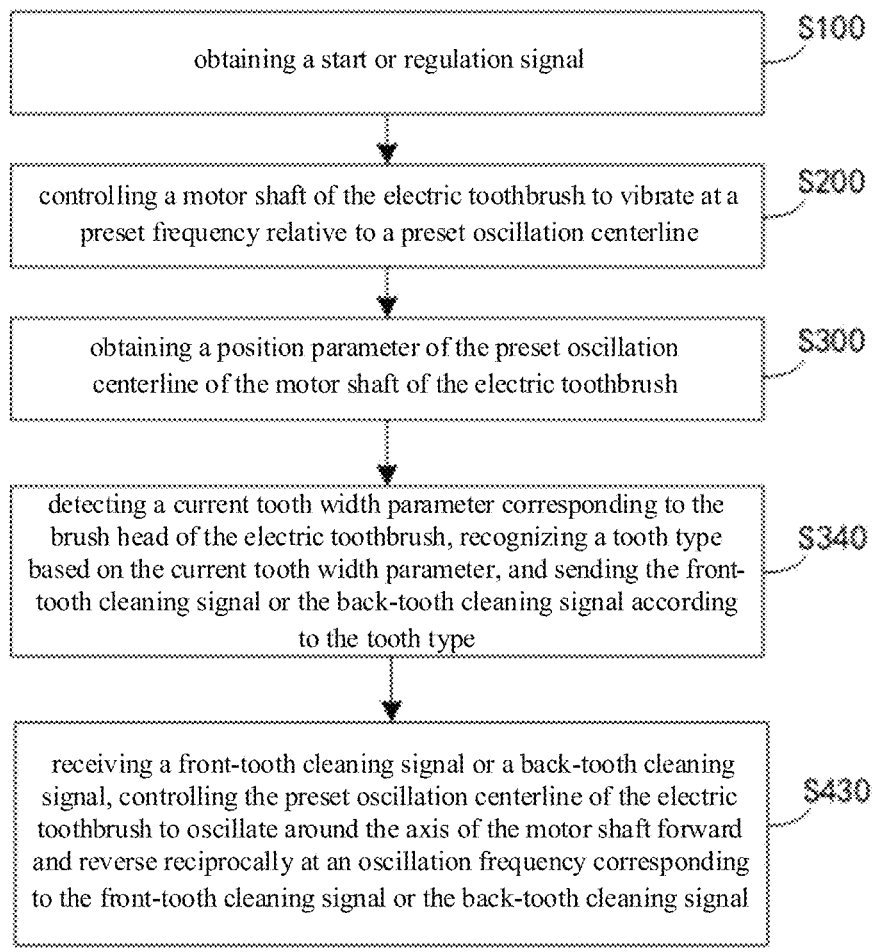
FIG. 8 is a flowchart of a motor control method for an electric toothbrush according to an eighth embodiment of the present disclosure.

In other embodiments, as shown in FIG. 8, after step S300 and before step S430, the method further includes:

At block S340: detecting a current tooth width parameter corresponding to the brush head of the electric toothbrush, recognizing a tooth type based on the current tooth width parameter, and sending the front-tooth cleaning signal or the back-tooth cleaning signal according to the tooth type.

Since the widths of the front teeth and the back teeth are different, e.g., the width of the front teeth of an adult is substantially around 5 mm to 8 mm, and the width of the back teeth is substantially around 8 mm to 10 mm, the tooth type may be accurately recognized by detecting the current tooth width parameter corresponding to the brush head of the electric toothbrush. Of course, the tooth type may be recognized by other parameters. Specifically, the current tooth width parameter may be detected by a collection unit, and the collected tooth width parameter is transmitted to a main control chip to recognize the tooth type; the preset oscillation frequency is selected according to the tooth type, where the front-tooth cleaning signal and the back-tooth cleaning signal correspond to different set oscillation frequencies, and the corresponding cleaning signal is sent; then the electric toothbrush is controlled to clean with the preset oscillation frequency corresponding to the cleaning signal. The collection unit may be a distance sensor or a micro camera, but is not limited thereto, and may be other sensors.

Further, after the step of detecting the current tooth width parameter and before the step of recognizing the tooth type according to the current tooth width parameter, the method further includes: in response to an error existing in the current tooth width parameter corresponding to the brush head of the electric toothbrush, and when the error is outside a normal tooth width parameter range, feeding back a "wrong information" prompt, adopting a closest normal tooth width to fill in the wrong information, and recognizing the tooth type according to the closest normal tooth width. For example, when there is an error in the collected parameter, such as when the width of the tooth is collected to be 1 mm, the wrong information is fed back to the main control chip, in which case a closest collected width, such as the minimum width of the tooth of 5 mm, is called and adopted, the tooth is recognized as a front tooth, and the front-tooth cleaning signal is subsequently sent to fill in the wrong information.

The electric toothbrush may further recognize an adult and a child in order to perform a child lock when it is recognized as being for use by a child, or not to distinguish between cleaning modes when it is recognized as being for use by a child. The electric toothbrush may be recognized as being for use by an adult by means of a fingerprint when a finger touches the key, and it can be understood that recognizing an adult by means of a fingerprint is not the only way and may be implemented by means of face recognition and the like.

Figure 9:
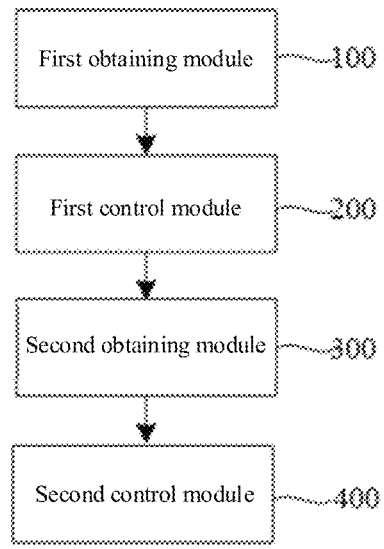
FIG. 9 is a schematic block view of a control device for an electric toothbrush according to some embodiments of the present disclosure.

As shown in FIG. 9, the present disclosure further proposes a motor control device for an electric toothbrush, including the following elements.

a first obtaining module 100, configured to obtain a start or regulation signal;

a first control module 200, configured to control a motor shaft 104 of the electric toothbrush to vibrate at a preset frequency relative to a preset oscillation centerline according to the start or regulation signal;

a second obtaining module 300, configured to obtain a position parameter of the preset oscillation centerline of the motor shaft 104 of the electric toothbrush; and a second control module 400, configured to control the preset oscillation centerline of the motor shaft 104 of the electric toothbrush to move around an axis of the motor shaft 104 along a preset trajectory.

Figure 10:
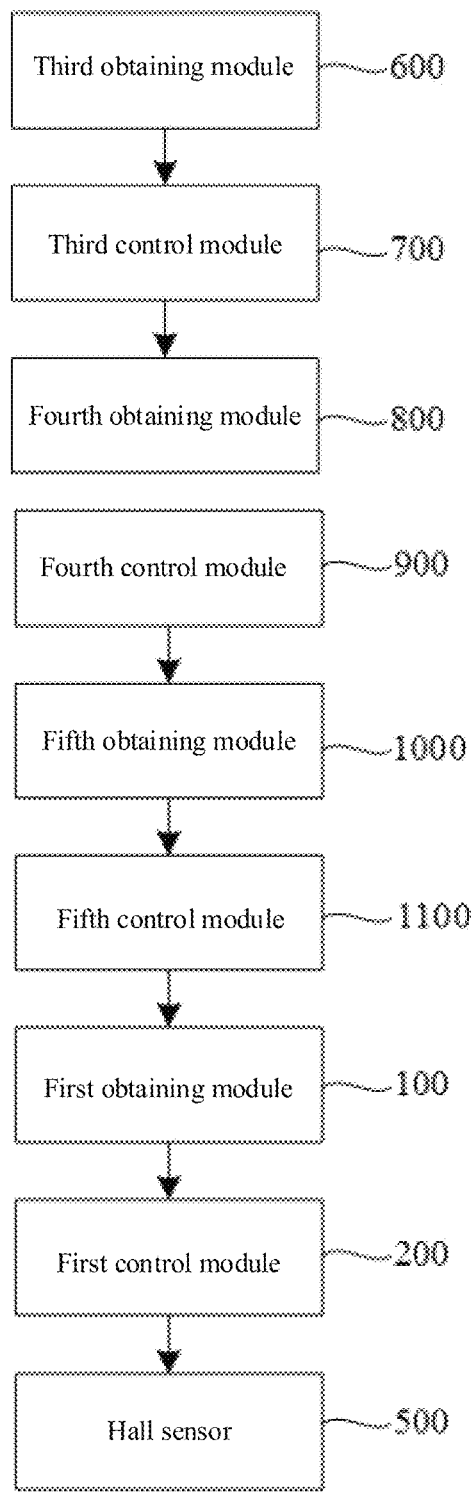
FIG. 10 is a schematic block view of a control device for an electric toothbrush according to other embodiments of the present disclosure.

Referring to FIG. 10, in some embodiments, the motor control device further includes a Hall sensor 500, and the Hall sensor 500 is configured to obtain a forward maximum vibration position parameter and a reverse maximum vibration position parameter of the motor shaft 104 of the electric toothbrush around the axis according to the start or regulation signal, and determine the position parameter of the preset oscillation centerline of the electric toothbrush according to the forward maximum vibration position parameter and the reverse maximum vibration position parameter.

In some embodiments, the second control module 400 is configured to, in an oscillation mode, control the preset oscillation centerline of the electric toothbrush to oscillate a preset angle around the axis of the motor shaft 104 in a forward and reverse reciprocation, the preset angle being greater than or equal to 10 degrees and less than or equal to 60 degrees; and/or the second control module 400 is configured to, in a rotation mode, control the preset oscillation centerline of the electric toothbrush to rotate 360 degrees around the axis of the motor shaft 104.

In some embodiments, the first control module 200 is configured to control the motor shaft 104 of the electric toothbrush to reciprocally vibrate around the axis at a constant power relative to the preset oscillation centerline according to the start or regulation signal.

In some embodiments, the second control module 400 is configured to control the preset oscillation centerline of the motor shaft 104 of the electric toothbrush to oscillate about the axis of the motor shaft 104 in a forward and reverse reciprocation at a preset frequency; where a ratio of the preset frequency of the motor shaft 104 vibrating to the preset frequency of the preset oscillation centerline of the motor shaft 104 oscillating in the forward and reverse reciprocation about the axis of the motor shaft 104 is greater than or equal to 60.

In some embodiments, the first control module 200 is configured to control the motor shaft 104 of the electric toothbrush to vibrate at a preset vibration frequency and a preset vibration angle relative to the preset oscillation centerline through Field Oriented Control (FOC).

The second control module 400 is configured to control the preset oscillation centerline of the motor shaft 104 of the electric toothbrush to rotate around the axis of the motor shaft 104 at a preset oscillation angle and a preset oscillation speed through the FOC.

In some embodiments, as shown in FIG. 10, the motor control device further includes the following element.

a third obtaining module 600, configured to receive a motor calibration preparation signal;

a third control module 700, configured to control the motor shaft to stop vibrating, and release a control on the motor by a key, such that the motor shaft 104 is enabled to rotate around the axis under an action of an external force; and send a motor start calibration signal in response to the motor shaft 104 being rotated until the preset oscillation centerline is aligned with a vertical centerline of the key of the electric toothbrush in a radial direction of the motor shaft 104;

a fourth obtaining module 800, configured to receive the motor start calibration signal;

a fourth control module 900, configured to obtain a current position of the preset oscillation centerline of the motor shaft 104 of the electric toothbrush according to the motor start calibration signal, and define the current position of the preset oscillation centerline of the motor shaft 104 as a preset initial position;

a fifth obtaining module 1000, configured to receive a brush head calibration signal; and a fifth control module 1100, configured to control the preset oscillation centerline of the motor shaft 104 of the electric toothbrush to rotate to the preset initial position according to the brush head calibration signal.

In some embodiments, the motor control device further includes the following element.

a sixth obtaining module, configured to receive a front-tooth cleaning signal or a back-tooth cleaning signal; and a sixth control module, configured to control the preset oscillation centerline of the electric toothbrush to oscillate around the axis of the motor shaft 104 in a forward and reverse reciprocation at an oscillation frequency corresponding to the front-tooth cleaning signal or the back-tooth cleaning signal.

In some embodiments, the motor control device further includes the following element.

an obtaining module, configured to detect a current tooth width parameter corresponding to the brush head of the electric toothbrush; and a recognition module, configured to recognize a tooth type based on the current tooth width parameter, and send the front-tooth cleaning signal or the back-tooth cleaning signal according to the tooth type.

Since the motor control device of the present disclosure is adopted with the technical solutions corresponding to all the embodiments of the above-described motor control method, it has at least all the beneficial effects brought about by the technical solutions of the above-described embodiments, which will not be repeated herein.

Figure 11:
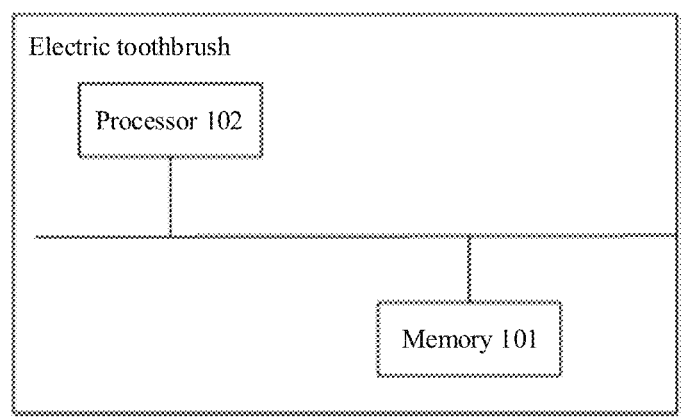
FIG. 11 is a schematic module view of an electric toothbrush according to some embodiments of the present disclosure.
Figure 12:
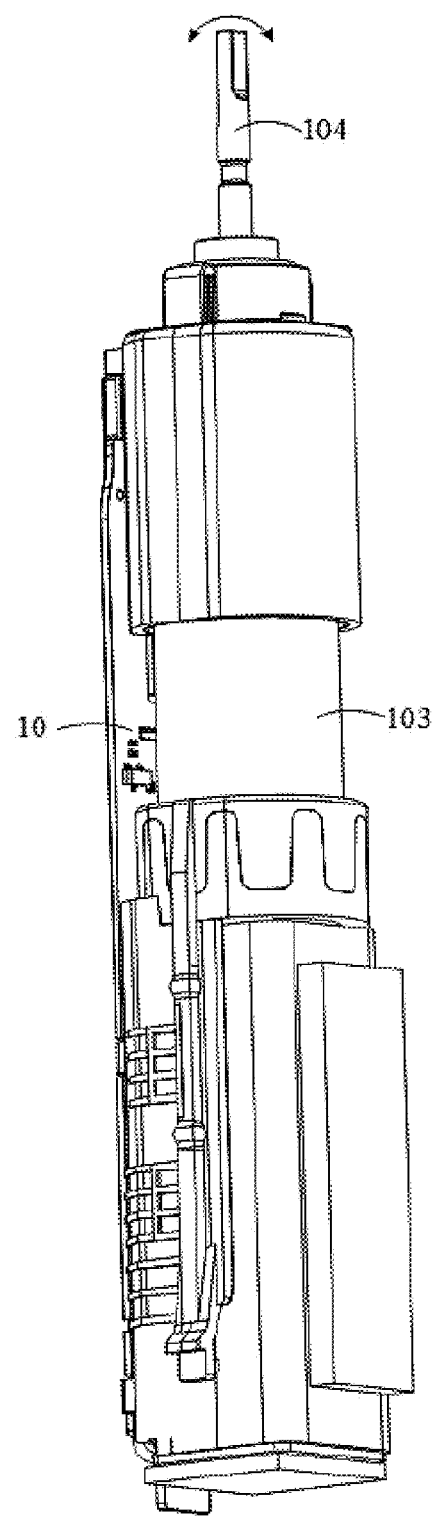
FIG. 12 is a structural schematic view of an electric toothbrush according to some embodiments of the present disclosure.

Exemplarily, referring to FIGS. 11 and 12, the present disclosure further proposes an electric toothbrush including a motor 103, a memory 101, a processor 102, and a program stored in the memory 101 for realizing a motor control method for the electric toothbrush; the memory 101 is configured to store the program for realizing the motor control method for the electric toothbrush; the processor 102 is configured to execute the program for realizing the motor control method for the electric toothbrush, to implement the steps as described in any of the above embodiments. The motor 103 may specifically be a servo motor 103. The processor 102 and the memory 101 are connected via a bus, which is for example a serial peripheral interface (SPI) bus or an inter-integrated circuit (I2C) bus. Specifically, the processor 102 may be a Micro-controller Unit (MCU), a Central Processing Unit (CPU), or a Digital Signal Processor (DSP), etc. Specifically, the memory 101 may be a flash chip, a Read-Only Memory 101 (ROM) disk, a CD-ROM, a USB flash drive, or a removable hard disk, etc.

For example, the processor 102 is configured to execute the computer program stored in the memory 101 and implement the following steps in executing the computer program:

obtaining a start or regulation signal;

controlling a motor shaft 104 of the electric toothbrush to vibrate at a preset frequency relative to a preset oscillation centerline according to the start or regulation signal;

obtaining a position parameter of the preset oscillation centerline of the motor shaft 104 of the electric toothbrush; and controlling the preset oscillation centerline of the motor shaft 104 of the electric toothbrush to move around an axis of the motor shaft 104 along a preset trajectory.

The specific implementation of each of the above steps of the method for controlling the motor of the electric toothbrush can be found in the preceding embodiments and will not be repeated herein. Since the electric toothbrush is adopted with all the technical solutions of all the above embodiments of the motor control method for the electric toothbrush, it has at least all the beneficial effects brought about by the technical solutions of the above embodiments, which will not be repeated herein.

The present disclosure further proposes a control system for an electric toothbrush, including the electric toothbrush and a mobile management module wirelessly communicatively connected to the electric toothbrush; the mobile management module includes a mobile terminal for supporting an operation of an APP and the APP for interacting with the electric toothbrush.

The APP provides an operation interface for obtaining an external operation, and the APP can generate a motor control command based on an external operation and send the motor control command to the electric toothbrush; the electric toothbrush obtains the motor control command and controls the motor 103 to run.

The mobile terminal of the present disclosure may be a smartphone, a tablet computer, a portable computer, and other movable terminal devices. By running the APP on the mobile terminal and interacting with the electric toothbrush on the APP, the user can operate and control the electric toothbrush by operating the operation interface of the APP, such as turning on/off the high-frequency mode, clicking to restore the parameters of the current mode, adjusting the vibration frequency, oscillation speed, and oscillation angle of the electric toothbrush, setting the brushing duration, switching brushing modes, etc., which greatly enhances the usage convenience for the user.

Further, the electric toothbrush is connected to the mobile management module via a wireless communication module for outputting a motor operation parameter, the APP outputs a motor control command based on an external operation to change the motor operation parameter, and the electric toothbrush obtains the motor control command and operates according to the modified motor operation parameter. The wireless communication module may specifically be a Bluetooth module, Wi-Fi, and other wireless communication structures. In this way, the user can directly adjust the motor operation parameter of the electric toothbrush by operating the operation interface of the APP, which improves the operation convenience.

Exemplarily, the motor operation parameter includes: a vibration frequency at which the motor shaft 104 of the electric toothbrush vibrates around its axis relative to the preset oscillation centerline, an oscillation speed at which the preset oscillation centerline of the motor shaft 104 of the electric toothbrush moves around the axis of the motor shaft 104 along a preset trajectory, and an angle at which the preset oscillation center of the electric toothbrush rotates around the axis of the motor shaft.

Figure 13:
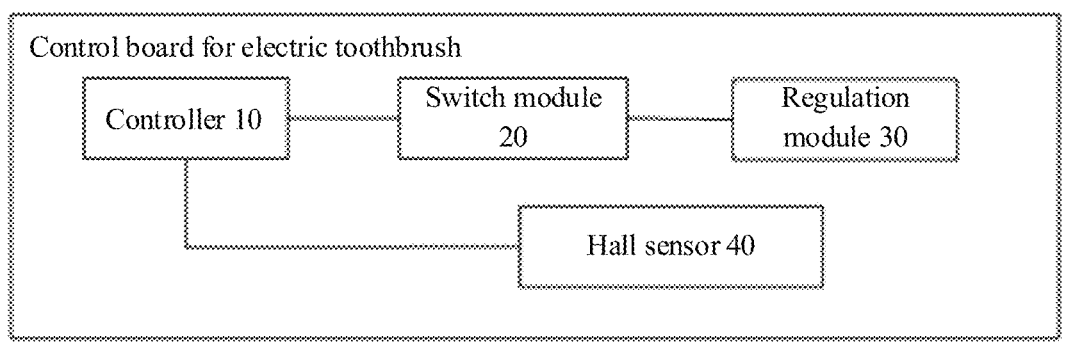
FIG. 13 is a schematic block view of a control board for an electric toothbrush according to some embodiments of the present disclosure.

As shown in FIG. 13, the present disclosure further proposes a control board for an electric toothbrush, including:

- a switch module 20, configured to output a switching signal;
- a regulation module 30, configured to output a motor parameter regulation signal;
- a Hall sensor 40, configured to detect a position parameter of a preset oscillation centerline of a motor shaft 104 of the electric toothbrush; and
- a controller 10; where an input end of the controller 10 is electrically connected to the switch module 20 and the regulation module 30, and an output end of the controller 10 is electrically connected to a motor 103 of the electric toothbrush;
- where the controller 10 is configured to obtain a start or regulation signal and control the motor shaft 104 of the electric toothbrush to vibrate at a preset frequency relative to the preset oscillation centerline according to the start or regulation signal; the controller 10 is further configured to control the preset oscillation centerline of the motor shaft 104 of the electric toothbrush to move around an axis of the motor shaft 104 along a preset trajectory.

Since the control board of the present disclosure is adopted with the technical solution corresponding to all the embodiments of the above-described motor control method, it has at least all the beneficial effects brought about by the technical solution of the above-described embodiments, which will not be repeated herein.

The present disclosure further proposes a readable storage medium, where the computer-readable storage medium is configured to store one or more programs which are executable by one or more processors 102; the readable storage medium is configured to store a motor control program for an electric toothbrush, the motor control program being executable by the processor 102 to realize the steps of the method of controlling the motor of the electric toothbrush as described in any of the above embodiments.

For example, the computer program is loaded by the processor 102 and may perform the following steps.

- obtaining a start or regulation signal;
- controlling a motor shaft 104 of the electric toothbrush to vibrate at a preset frequency relative to a preset oscillation centerline;
- obtaining a position parameter of the preset oscillation centerline of the motor shaft 104 of the electric toothbrush; and
- controlling the preset oscillation centerline of the motor shaft 104 of the electric toothbrush to move around an axis of the motor shaft 104 along a preset trajectory.

Specific implementations of the above steps in the motor control method for the electric toothbrush can be found in the preceding embodiments and will not be repeated herein. Since the present readable storage medium is adopted with the technical solutions corresponding to all the embodiments of the above-described motor control method, it has at least all of the beneficial effects brought about by the technical solutions of the above embodiments, which will not be repeated herein.

The computer-readable readable storage medium may be an internal storage unit of electric toothbrush in the aforementioned embodiments, such as a hard disk or memory. The computer-readable storage medium may be an external storage device of the electric toothbrush, such as a plug-in hard disk, a Smart Media Card (SMC), a Secure Digital (SD) card, a Flash Card, etc.

Since the computer program stored in the computer-readable storage medium can execute any one of the above-described motor control methods provided in the embodiments of the present disclosure, the beneficial effects that can be realized by any one of the motor control methods provided in the embodiments of the present disclosure can be achieved herein, which will not be repeated herein.

The above is only some embodiments of the present disclosure, and is not intended to limit the scope of the present disclosure. Any equivalent structure or equivalent process transformation utilizing the contents of the specification and the accompanying drawings of the present disclosure, or directly or indirectly utilized in other related fields of technology, are all included in the scope of the present disclosure by the same reason.

Finally, it should be noted that the above embodiments are only intended to illustrate the technical solutions of the present disclosure, and not to limit them. Although the present disclosure has been described in detail with reference to the foregoing embodiments, those skilled in the art should understand that it is still possible to make modifications to the technical solutions recorded in the foregoing embodiments, or to make equivalent replacements for some of the technical features therein. These modifications or substitutions do not cause the essence of the technical solutions to depart from the spirit and scope of the technical solutions of the embodiments in the present disclosure.

What is claimed is:

1. A motor control method for an electric toothbrush, comprising:
   - obtaining a start or regulation signal;
   - controlling a motor shaft of the electric toothbrush to vibrate at a preset frequency relative to a preset oscillation centerline according to the start or regulation signal;
   - obtaining a position parameter of the preset oscillation centerline of the motor shaft of the electric toothbrush; and
   - controlling the preset oscillation centerline of the motor shaft of the electric toothbrush to move around an axis of the motor shaft along a preset trajectory.

2. The motor control method according to claim 1, wherein the obtaining a position parameter of the preset oscillation centerline of the motor shaft of the electric toothbrush comprises:
   - obtaining a forward maximum vibration position parameter and a reverse maximum vibration position parameter of the motor shaft of the electric toothbrush around the axis through a Hall sensor according to the start or regulation signal, and determining the position parameter of the preset oscillation centerline of the electric toothbrush according to the forward maximum vibration position parameter and the reverse maximum vibration position parameter.

3. The motor control method according to claim 1, wherein the controlling the preset oscillation centerline of the motor shaft of the electric toothbrush to move around an axis of the motor shaft along a preset trajectory comprises:
- in an oscillation mode, controlling the preset oscillation centerline of the electric toothbrush to oscillate a preset angle around the axis of the motor shaft in a forward and reverse reciprocation;
- wherein the preset angle is greater than or equal to 10 degrees and less than or equal to 60 degrees; and/or
- in a rotation mode, controlling the preset oscillation centerline of the electric toothbrush to rotate 360 degrees around the axis of the motor shaft.

4. The motor control method according to claim 1, wherein the controlling the preset oscillation centerline of the motor shaft of the electric toothbrush to move around an axis of the motor shaft along a preset trajectory comprises:
- controlling the preset oscillation centerline of the motor shaft of the electric toothbrush to oscillate about the axis of the motor shaft in a forward and reverse reciprocation at a preset frequency; wherein a ratio of the preset frequency of the motor shaft vibrating to the preset frequency of the preset oscillation centerline of the motor shaft oscillating in the forward and reverse reciprocation about the axis of the motor shaft is greater than or equal to 60.

5. The motor control method according to claim 1, wherein the controlling a motor shaft of the electric toothbrush to vibrate at a preset frequency relative to a preset oscillation centerline according to the start or regulation signal comprises:
- controlling the motor shaft of the electric toothbrush to vibrate at a preset vibration frequency and a preset vibration angle relative to the preset oscillation centerline through Field Oriented Control (FOC);
- wherein the controlling the preset oscillation centerline of the motor shaft of the electric toothbrush to move around an axis of the motor shaft along a preset trajectory comprises:
- controlling the preset oscillation centerline of the motor shaft of the electric toothbrush to rotate around the axis of the motor shaft at a preset oscillation angle and a preset oscillation speed through the FOC.

6. The motor control method according to claim 1, before the obtaining a start or regulation signal, further comprising:
- receiving a motor calibration preparation signal, controlling the motor shaft to stop vibrating, and releasing a control on a motor by a key, such that the motor shaft is enabled to rotate around the axis under an action of an external force;
- sending a motor start calibration signal in response to the motor shaft being rotated until the preset oscillation centerline is aligned with a vertical centerline of the key of the electric toothbrush in a radial direction of the motor shaft;
- receiving the motor start calibration signal; obtaining a current position of the preset oscillation centerline of the motor shaft of the electric toothbrush according to the motor start calibration signal, and defining the current position of the preset oscillation centerline of the motor shaft as a preset initial position; and
- receiving a brush head calibration signal; and controlling the preset oscillation centerline of the motor shaft of the electric toothbrush to rotate to the preset initial position according to the brush head calibration signal.

7. The motor control method according to claim 1, wherein the controlling the preset oscillation centerline of the motor shaft of the electric toothbrush to move around an axis of the motor shaft along a preset trajectory comprises:
- receiving a front-tooth cleaning signal or a back-tooth cleaning signal; and controlling the preset oscillation centerline of the electric toothbrush to oscillate around the axis of the motor shaft in a forward and reverse reciprocation at an oscillation frequency corresponding to the front-tooth cleaning signal or the back-tooth cleaning signal.

8. The motor control method according to claim 7, wherein after the obtaining a position parameter of the preset oscillation centerline of the motor shaft of the electric toothbrush, and before the receiving a front-tooth cleaning signal or a back-tooth cleaning signal; and
- controlling the preset oscillation centerline of the electric toothbrush to oscillate around the axis of the motor shaft in a forward and reverse reciprocation at an oscillation frequency corresponding to the front-tooth cleaning signal or the back-tooth cleaning signal, the motor control method further comprises:
- detecting a current tooth width parameter corresponding to the brush head of the electric toothbrush, recognizing a tooth type based on the current tooth width parameter, and sending the front-tooth cleaning signal or the back-tooth cleaning signal according to the tooth type.

9. A motor control device for an electric toothbrush, comprising:
- a first obtaining module, configured to obtain a start or regulation signal;
- a first control module, configured to control a motor shaft of the electric toothbrush to vibrate at a preset frequency relative to a preset oscillation centerline according to the start or regulation signal;
- a second obtaining module, configured to obtain a position parameter of the preset oscillation centerline of the motor shaft of the electric toothbrush; and
- a second control module, configured to control the preset oscillation centerline of the motor shaft of the electric toothbrush to move around an axis of the motor shaft along a preset trajectory.

10. The motor control device according to claim 9, further comprising:
- a Hall sensor, configured to obtain a forward maximum vibration position parameter and a reverse maximum vibration position parameter of the motor shaft of the electric toothbrush around the axis according to the start or regulation signal, and determine the position parameter of the preset oscillation centerline of the electric toothbrush according to the forward maximum vibration position parameter and the reverse maximum vibration position parameter.

11. The motor control device according to claim 9, wherein the second control module is configured to, in an oscillation mode, control the preset oscillation centerline of the electric toothbrush to oscillate a preset angle around the axis of the motor shaft in a forward and reverse reciprocation, the preset angle being greater than or equal to 10 degrees and less than or equal to 60 degrees; and/or
- the second control module is configured to, in a rotation mode, control the preset oscillation centerline of the electric toothbrush to rotate 360 degrees around the axis of the motor shaft.

12. The motor control device according to claim 9, wherein,
- the second control module is configured to control the preset oscillation centerline of the motor shaft of the electric toothbrush to oscillate about the axis of the motor shaft in a forward and reverse reciprocation at a preset frequency; a ratio of the preset frequency of the motor shaft vibrating to the preset frequency of the preset oscillation centerline of the motor shaft oscillating in the forward and reverse reciprocation about the axis of the motor shaft is greater than or equal to 60.

13. The motor control device according to claim 9, wherein the first control module is configured to control the motor shaft of the electric toothbrush to vibrate at a preset vibration frequency and a preset vibration angle relative to the preset oscillation centerline through Field Oriented Control (FOC);

the second control module is configured to control the preset oscillation centerline of the motor shaft of the electric toothbrush to rotate around the axis of the motor shaft at a preset oscillation angle and a preset oscillation speed through the FOC.

14. The motor control device according to claim 9, further comprising:

a third obtaining module, configured to receive a motor calibration preparation signal;

a third control module, configured to control the motor shaft to stop vibrating, and release a control on a motor by a key, such that the motor shaft is enabled to rotate around the axis under an action of an external force; and send a motor start calibration signal in response to the motor shaft being rotated until the preset oscillation centerline is aligned with a vertical centerline of the key of the electric toothbrush in a radial direction of the motor shaft;

a fourth obtaining module, configured to receive the motor start calibration signal;

a fourth control module, configured to obtain a current position of the preset oscillation centerline of the motor shaft of the electric toothbrush according to the motor start calibration signal, and define the current position of the preset oscillation centerline of the motor shaft as a preset initial position;

a fifth obtaining module, configured to receive a brush head calibration signal; and a fifth control module, configured to control the preset oscillation centerline of the motor shaft of the electric toothbrush to rotate to the preset initial position according to the brush head calibration signal.

15. The motor control device according to claim 9, further comprising:

a sixth obtaining module, configured to receive a front-tooth cleaning signal or a back-tooth cleaning signal; and a sixth control module, configured to control the preset oscillation centerline of the electric toothbrush to oscillate around the axis of the motor shaft in a forward and reverse reciprocation at an oscillation frequency corresponding to the front-tooth cleaning signal or the back-tooth cleaning signal.

16. The motor control device according to claim 15, further comprising:

an obtaining module, configured to detect a current tooth width parameter corresponding to the brush head of the electric toothbrush; and a recognition module, configured to recognize a tooth type based on the current tooth width parameter, and send the front-tooth cleaning signal or the back-tooth cleaning signal according to the tooth type.

17. An electric toothbrush, comprising:
a motor,
a memory,
a processor, and
a non-transitory computer program stored in the memory;

wherein the processor is configured to execute the non-transitory computer program to perform a motor control method; wherein the motor control method comprises the following steps:

obtaining a start or regulation signal;

controlling a motor shaft of the electric toothbrush to vibrate at a preset frequency relative to a preset oscillation centerline according to the start or regulation signal;

obtaining a position parameter of the preset oscillation centerline of the motor shaft of the electric toothbrush; and controlling the preset oscillation centerline of the motor shaft of the electric toothbrush to move around an axis of the motor shaft along a preset trajectory.

18. The electric toothbrush according to claim 17, wherein the step of obtaining a position parameter of the preset oscillation centerline of the motor shaft of the electric toothbrush comprises:

obtaining a forward maximum vibration position parameter and a reverse maximum vibration position parameter of the motor shaft of the electric toothbrush around the axis through a Hall sensor according to the start or regulation signal, and determining the position parameter of the preset oscillation centerline of the electric toothbrush according to the forward maximum vibration position parameter and the reverse maximum vibration position parameter.

19. The electric toothbrush according to claim 17, wherein the step of controlling the preset oscillation centerline of the motor shaft of the electric toothbrush to move around an axis of the motor shaft along a preset trajectory comprises:

in an oscillation mode, controlling the preset oscillation centerline of the electric toothbrush to oscillate a preset angle around the axis of the motor shaft in a forward and reverse reciprocation; wherein the preset angle is greater than or equal to 10 degrees and less than or equal to 60 degrees; and/or in a rotation mode, controlling the preset oscillation centerline of the electric toothbrush to rotate 360 degrees around the axis of the motor shaft.

20. The electric toothbrush according to claim 17, wherein the step of controlling the preset oscillation centerline of the motor shaft of the electric toothbrush to move around an axis of the motor shaft along a preset trajectory comprises:

controlling the preset oscillation centerline of the motor shaft of the electric toothbrush to oscillate about the axis of the motor shaft in a forward and reverse reciprocation at a preset frequency; wherein a ratio of the preset frequency of the motor shaft vibrating to the preset frequency of the preset oscillation centerline of the motor shaft oscillating in the forward and reverse reciprocation about the axis of the motor shaft is greater than or equal to 60.

21. The electric toothbrush according to claim 17, wherein the step of controlling a motor shaft of the electric toothbrush to vibrate at a preset frequency relative to a preset oscillation centerline according to the start or regulation signal comprises:

controlling the motor shaft of the electric toothbrush to vibrate at a preset vibration frequency and a preset vibration angle relative to the preset oscillation centerline through Field Oriented Control (FOC);

wherein the controlling the preset oscillation centerline of the motor shaft of the electric toothbrush to move around an axis of the motor shaft along a preset trajectory comprises:
  controlling the preset oscillation centerline of the motor shaft of the electric toothbrush to rotate around the axis of the motor shaft at a preset oscillation angle and a preset oscillation speed through the FOC.

22. The electric toothbrush according to claim 17, before the step of obtaining a start or regulation signal, the motor control method further comprises:
  receiving a motor calibration preparation signal, controlling the motor shaft to stop vibrating, and releasing a control on a motor by a key, such that the motor shaft is enabled to rotate around the axis under an action of an external force;
  sending a motor start calibration signal in response to the motor shaft being rotated until the preset oscillation centerline is aligned with a vertical centerline of the key of the electric toothbrush in a radial direction of the motor shaft;
  receiving the motor start calibration signal; obtaining a current position of the preset oscillation centerline of the motor shaft of the electric toothbrush according to the motor start calibration signal, and defining the current position of the preset oscillation centerline of the motor shaft as a preset initial position; and
  receiving a brush head calibration signal; and controlling the preset oscillation centerline of the motor shaft of the electric toothbrush to rotate to the preset initial position according to the brush head calibration signal.

23. The electric toothbrush according to claim 17, wherein the step of controlling the preset oscillation centerline of the motor shaft of the electric toothbrush to move around an axis of the motor shaft along a preset trajectory comprises:
  receiving a front-tooth cleaning signal or a back-tooth cleaning signal; and controlling the preset oscillation centerline of the electric toothbrush to oscillate around the axis of the motor shaft in a forward and reverse reciprocation at an oscillation frequency corresponding to the front-tooth cleaning signal or the back-tooth cleaning signal.

24. A control system, comprising the electric toothbrush according to claim 17 and a mobile management module wirelessly communicatively connected to the electric toothbrush; wherein the mobile management module comprises an application for interacting with the electric toothbrush and a mobile terminal for supporting an operation of the application;
  the application provides an operation interface for obtaining an external operation, and the application is configured to generate a motor control command based on an external operation and send the motor control command to the electric toothbrush; the electric toothbrush is configured to obtain the motor control command and control the motor to run.

25. The control system according to claim 24, wherein the electric toothbrush is connected to the mobile management module via a wireless communication module for outputting a motor operation parameter; the application is configured to output the motor control command based on the external operation to change the motor operation parameter, and the electric toothbrush is configured to obtain the motor control command and operate according to the changed motor operation parameter.

26. The control system according to claim 25, wherein the motor operation parameter comprises: a vibration frequency at which the motor shaft of the electric toothbrush vibrates around the axis relative to the preset oscillation centerline, an oscillation speed at which the preset oscillation centerline of the motor shaft of the electric toothbrush moves around the axis of the motor shaft along the preset trajectory, and an angle at which the preset oscillation center of the electric toothbrush rotates around the axis of the motor shaft.

\* \* \* \* \*